May 10, 1966 R. BREUNING 3,250,154
BORING OR INTERNAL THREADING TOOL
Filed Sept. 26, 1963 3 Sheets-Sheet 1
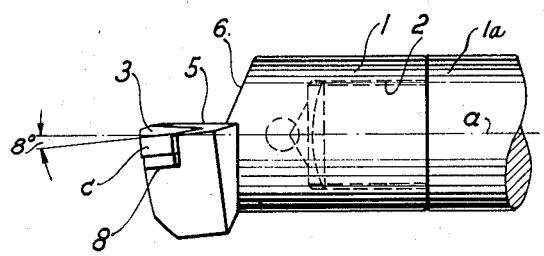
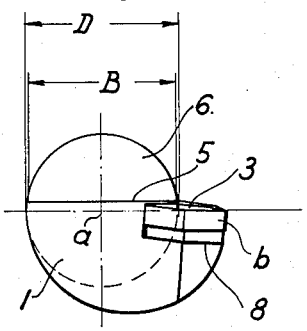
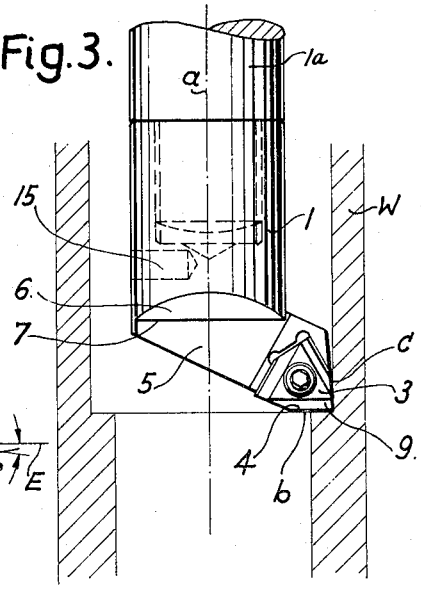
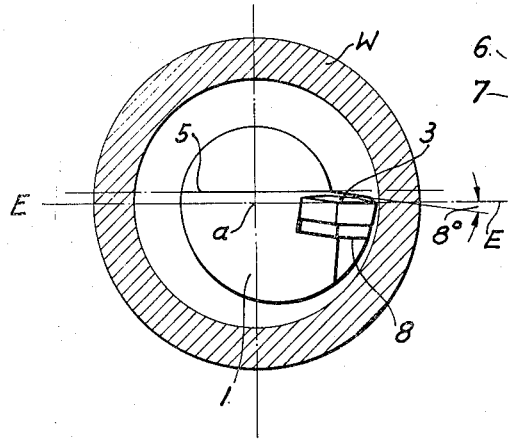
INVENTOR.
ROBERT BREUNING
BY
Woodhams, Blanchard & Flynn
ATTORNEYS May 10, 1966 R. BREUNING 3,250,154
BORING OR INTERNAL THREADING TOOL
Filed Sept. 26, 1963 3 Sheets-Sheet 2

INVENTOR.
ROBERT BREUNING
BY
Woodhams, Blanchard & Flynn
ATTORNEYS

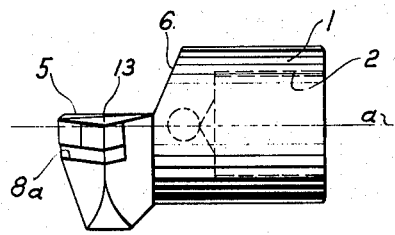
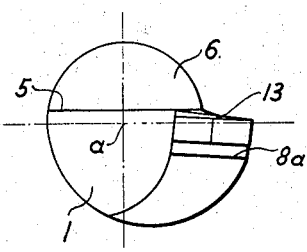
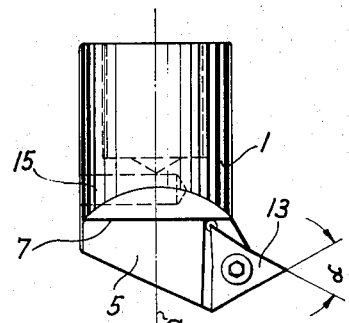
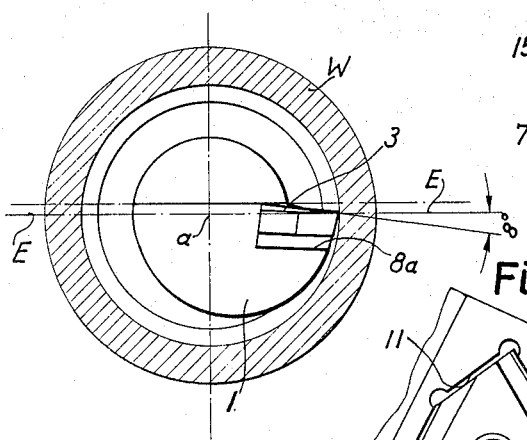
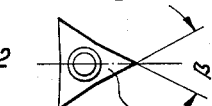
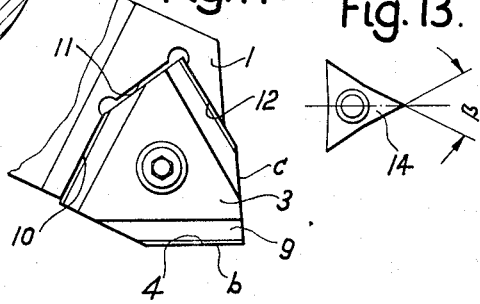
INVENTOR.
ROBERT BREUNING

United States Patent Office 3,250,154
Patented May 10, 1966

3,250,154
BORING OR INTERNAL THREADING TOOL
Robert Breuning, 58 Hauptstrasse, Besigheim
(Neckar), Germany
Filed Sept. 26, 1963, Ser. No. 311,904
Claims priority, application Germany, Sept. 27, 1962,
B 68,989
2 Claims. (Cl. 77—58)

The invention relates to a boring or internal threading tool, having a substantially cylindrical shank and a cutter mounted on the front end of the shank and projecting laterally beyond the latter. The known boring or internal threading tools have at their front end a fairly complicated form, due to the configuration of the cutter and its special arrangement. In addition, the form is also dependent on the fact that the cutter must be regrindable. Boring or internal threading tools with soldered or interchangeable tool bits also have such a complicated form. Due to this form, the known boring or internal threading tools are difficult to adjust so that the cutting edge is in the correct position relative to the work. In boring, and especially however in internal thread-cutting, the cutting edge must be situated exactly on the horizontal diameter of the work. If this is so, the movement of the tool post at right angles to the work axis in boring corresponds to an equally large movement of the cutting tool relative to the work. If the cutting edge is not situated on the horizontal diameter, the chip thickness is less than the chip thickness as read off on the measuring device of the tool post. It is therefore impossible to perform precision work with such an inaccurately adjusted tool. The same applies to the production of internal threads, but here there occurs additionally a distortion of the thread profile in the case of obliquity of the cutting tool. For this reason, it is of the greatest importance that the cutting edge should be situated exactly on the horizontal diameter of the work. It is furthermore also important that the cutter should engage at the cutting angle which is correct and optimum for the material being cut. In the known boring or internal threading tools, it may happen that despite correct vertical adjustment of the cutting edge, the latter is not at the prescribed angle to the work.

It is therefore the object of the present invention to provide a boring or internal threading tool which facilitates the correct adjustment of the cutter, whereby precision can also be increased at the same time. According to the present invention, this is achieved by providing on the front end of the shank a plane alignment face corresponding approximately in width to the shank diameter and permitting the application of a straight-edge or the like, said face extending axially of the shank and being so arranged in position relative to the cutting edge that with the alignment face in the horizontal position and the shank axis arranged in a horizontal plane passing through the work axis, the cutter is situated in the correct cutting position.

This construction has several advantages:

If, by means of a straight-edge or spirit level placed on the alignment face according to the invention, the head has been aligned to a horizontal position so that the effective cutting edge on the tool bit has the correct cutting angle position for boring, the boring or internal threading tool, while retaining this adjusted position, is then brought to the correct height by means of a vertical gauge, that is to say, the shank axis lies in a horizontal plane passing through the work axis.

The plane alignment face accordingly, by the application of a straight-edge or spirit level, ensures in a simple manner the correct position of the cutting edge relative to the work. The cutting edge is thus siutated on the horizontal diameter of the work, and in addition lies at the correct cutting angle thereto. In this way, a boring or internal threading tool can be brought into its correct position in the shortest possible time. With the new boring or internal threading tool, therefore, the set-up time is substantially reduced and, in addition, a higher precision is attained than with existing tools.

Further advantages and details of the invention will be explained more fully with reference to constructional examples shown in the drawings, wherein:

FIGURE 1 shows a side view of a boring tool in the so-called corner cutter form;

FIGURE 2 is an end view thereof;

FIGURE 3 shows a plan of the boring tool in the working position with the work being cut;

FIGURE 4 is an end view of this position;

FIGURES 9–12 show an internal threading tool for metric threads in the same representations as in FIGURES 1–4;

FIGURE 13 shows a plan of a tool bit for Whitworth threads;

FIGURE 14 shows details of the support of the hexagonal tolo bit shown in FIGURES 1–4.

Figure 5:
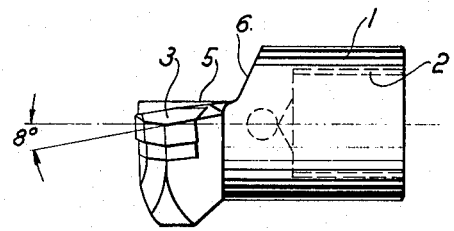
FIGURES 5–8 show a boring tool in so-called roughing tool form in the same representatons as in FIGURES 1–4.
Figure 6:
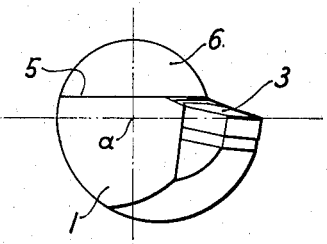
Figure 8:
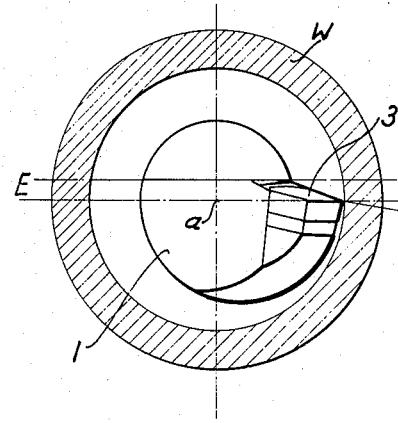
Figure 7:
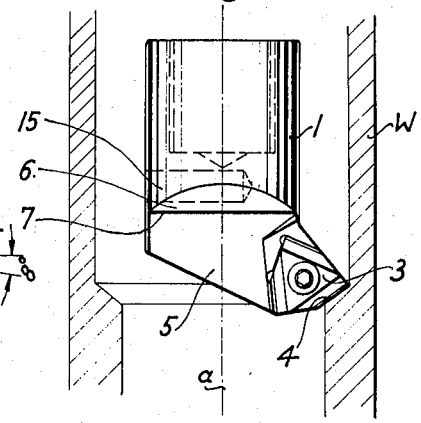

In the drawings, 1 denotes a substantially cylindrical shank of a boring tool. This boring tool can be used for machining rectangular steps in the interior of a workpiece. Said shank has an internal thread 2 by means of which it can be screwed on to a cylindrical boring bar 1a.

The shank of the boring tool and the boring bar may, however, be made of one piece if desired. The boring tools shown in the drawings, adapted to be screwed on the front ends of boring bars, are generally referred to as boring heads.

The boring tool shown has at its front end a cutter 3, which projects laterally beyond the shank 1, and as shown in the drawing, may be formed as insertable tool bit. In the constructional examples shown in FIGURES 1–8 and 14, the tool bit has a hexagonal shape, cutting edges 4 being provided on the upper face and lower face of the bit. Further details of this tool bit are described elsewhere.

According to the invention, the new boring tool has a plane alignment face 5 on the front end of the shank 1. This alignment face extends in the axial direction, its width B corresponding approximately to the shank diameter D. The alignment face extends continuously throughout the entire width B of the shank, so that it permits the application of a straight-edge, spirit level or the like. Laterally of the alignment face, therefore, there are no parts projecting upwardly above it. The alignment face is so arranged relative to the operative cutting edge 4 that, with horizontal position of the alignment face and arrangement of the shank axis $a$ in a horizontal plane E—E passing through the workpiece axis, the cutter is in the correct cutting position. This means that the point of the cutting edge 4 is arranged on the horizontal work diameter, situated in the plane E—E, and that in addition the cutting edge 4 of the tool bit 3 is at the correct cutting angle relative to the work. In this connection also, further details are explained elsewhere in the text.

On the front end of shank 1, there may be furthermore provided a face 6, which is inclined to the alignment face 5 and forms with the latter a straight intersection edge 7. The inclined face is here so arranged that the intersection edge extends at right angles to the shank axis. As will furthermore be appreciated from the drawing, the alignment face 5 is higher than the operative cutting edge 4 of the tool bit 3. A straight-edge or a spirit level may therefore be set on the alignment face 5, by means whereof the aligment face 5 can be set exactly horizontal. When a straight-edge is used, the horizontal position can be determined by sighting along it. In the case of coarse working, such as for example roughing, a straight-edge or spirit level is not at all necessary, since with good judgment by the eye, it is possible to determine without such aids where a surface is approximately horizontal. The above-mentioned intersection edge 7, which forms a straight line, also helps here. By comparison with the surrounding objects, it is possible to ascertain with the naked eye whether this straight line 7 is approximately horizontal. In this way, horizontal adjustment of the alignment face 5 can be carried out by means of the straight-edge or spirit level or even with the naked eye. If this face is in its horizontal position and if the shank axis $a$ also falls in the horizontal plane E—E, the cutter is automatically correctly adjusted.

In the constructional examples shown in the drawing, the new boring or internal threading tool is provided with an interchangeable tool bit. For this purpose, the shank has a recess with a supporting surface 8 for the tool bit 3. This supporting surface 8 is inclined downwardly forwardly and laterally relative to the operative edge 4. In this way, the tool bit is arranged hanging forwardly. This would result in a negative cutting angle at the position of the cut. By the provision of a chip-guiding step 9 on each edge 4, however, the negative cutting angle is converted into a positive angle. Such an arrangement has the advantage that the lateral faces $b$ and $c$ slope away from the work, thereby forming the necessary free surfaces, which even in small workpiece bores prevent the work from running on to the lateral faces of the tool bit. As shown in FIGURE 1, the forward inclination of the supporting surface 8 may be 8°. The lateral inclination is also 8°, as shown in FIGURE 4. These inclinations are used for the boring tool shown, as represented in FIGURES 1–4. By means of this boring tool, bores can be machined with a rectangularly arranged base.

For heavy chip removal, such as occurs in roughing, the arrangement of tool bit shown in FIGURES 5–8 is more suitable. In this constructional example, the bit 3 has merely been turned somewhat in the clockwise direction. The angles of inclination of the supporting face 8 have been retained here. It should be understood, however, that for a tool for machining rectangular steps, and for a roughing tool, a special recess is always to be provided, since the tool bit is supported in this recess not only by its lower face but also by its side faces. Details of this support are shown in FIGURE 14.

According to FIGURE 14, the recess provided for the tool bit 3 has three lateral faces 10, 11 and 12, which are so arranged that they support the tool bit only on the two outer lateral faces 10 and 12. Between the tool bit and the lateral face 11, however, an air gap is provided. The corners formed by the lateral faces 10, 11 and 12 are also bored out to obviate application of the cutting corners. By means of this step, the tool bit is supported in the recess reliably and always in the same angular position, and at the same time the delicate corners of the tool bit are protected from damage.

The constructional example shown in FIGURES 9–13 concerns an internal threading tool. This is similar in construction to the boring tools shown in FIGURES 1–4 and 5–8. In the case of the internal threading tool, a triangular tool bit 13 is provided in place of the hexagonal tool bit. The supporting surface 8a for this triangular tool bit is inclined laterally by 8°, as will be gathered from FIGURE 12. Forwardly, however, only an inclination of 1° .3′ is provided, this corresponding to the pitch factor of the thread which can be machined with this tool. In this case also, due to the hanging arrangement of the tool bit, the necessary free surfaces are provided on the cutting flanks. Since, due to the hanging arrangement of the tool bit, the thread profile is distorted somewhat, that is to say, the crest angle of the thread is somewhat larger, a correction of the angle $\alpha$ at the tip of the tool bit is necessary. For a thread with an angle of 60°, the angle $\alpha$ is somewhat less than 60°. The assumption of 60° is for a metric thread. If, however, a Whitworth thread profile is to be made, in which the thread flanks are inclined at 55° to each other, the angle $\beta$ of the tool bit 14 should be made somewhat less than 55°, as shown in FIGURE 13. The triangular tool bits shown in FIGURES 9–13 can also be used repeatedly by turning them, so that a new sharp cutting edge is always used.

For screwing or unscrewing the shank 1 on or off the cylindrical screw-threaded boring bar, the shank is preferably provided with a radial hole 15. A cylindrical rod may be inserted in this hole to act as lever arm for turning the shank. When machining with boring or internal threading tools screwed on the boring bar, these parts must be screwed firmly together to prevent unscrewing of the two parts, due to the cutting pressure. In this case, the rod facilities not only screwing on, but also unscrewing of the boring or internal threading tool off the boring bar.

With the boring or internal threading tools shown in the drawings, an interchangeable, repeatedly used tool bit has been provided, this bit being always held by a screw passing through it. Instead of an interchangeable tool bit, however, it is also possible to provide a permanently brazed bit of tungsten carbide or the like. It is also possible to make the entire shank and cutter of natural steel, so that therefore cutter and shank consist of one piece.

In the constructional examples so far described, the cutter has been described as being inclined downwardly towards the operative cutting edge. The cutter may be parallel to the alignment face, however, or inclined upwardly towards the operative edge. It is here solely of importance that the operative cutting edge is arranged below the alignment face, so that it does not impede the placing thereon of a straight-edge, spirit level or the like.

The two arrangements last mentioned, however, are not suitable for interchangeable tool bits having cutting edges on their upper and lower faces.

As already mentioned above, the intersection edge 7 is formed by the intersection of the alignment face 5 with the inclined face 6. This intersection edge extends at right angles to the shank axis. This fact also facilitates the adjustment of the internal threading tool in the following manner:

In thread-cutting, it is absolutely necessary that the shank axis of the internal threading tool should be parallel to the axis of the work. For the alignment of the internal threading tool, a straight-edge or the like is laid against the end face of the work and is allowed to rest on the alignment face 5. The internal threading tool is now aligned so that one edge of the straight-edge coincides with the intersection edge 7. Since this intersection edge is at right angles to the shank axis, the shank axis is therefore also aligned parallel to the axis of the work. This adjustment can be made rapidly and accurately, thanks to the novel construction of the internal threading tool.

Figure 15:
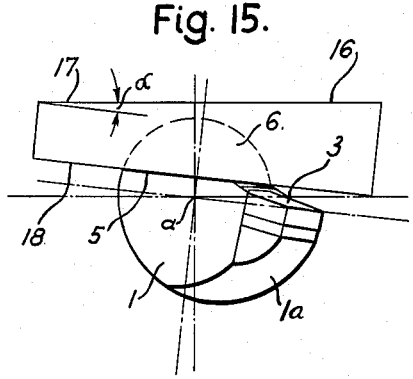
FIGURES 15 and 16 are different positions of the alignment straight-edge to be placed on the alignment face for setting different cutting angles.
Figure 16:
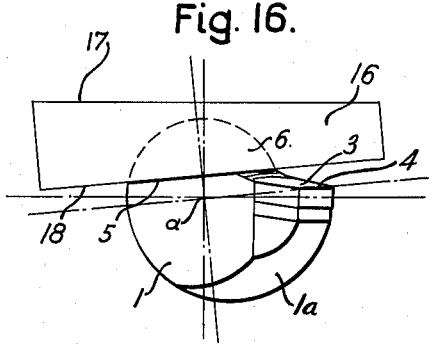

For machining a definite material, such as for example steel, the cutting edge 4 of the tool bit 3 has a definite angular position to the alignment face 5, this angular position, with the alignment face in the horizontal position then giving the correct cutting angle for the material concerned, in this case steel. If another material, such as for example aluminium or grey cast iron, is to be machined with the same boring tool, then in order to execute the best possible machining work the cutting angle must be altered. This would be possible per se by giving the supporting surface 8 another inclination. It is, however, possible by means of a simple alignment straight-edge 16, as shown in FIGURES 15 and 16, to machine other materials, such as for example aluminium and grey cast iron, with the boring tool intended for steel. For this purpose, the alignment face 5 must be inclined to the horizontal, the angle of inclination of the alignment face being the difference between the desired cutting angle and the fixed cutting angle of the boring tool. To be able to adjust the alignment face correctly in a simple manner, it is proposed to use an alignment straight-edge 16, having two oppositely inclined longitudinal edges 17 and 18. The longitudinal edges include an angle δ, corresponding to the difference between the cutting angle fixed on the boring tool and the desired cutting angle favorable for machining the other work. The alignment straight-edge is set with the longitudinal edge 18 on the alignment face 5, whereupon the longitudinal edge 17 is brought into the horizontal position. When the longitudinal edge 17 is in the horizontal position, the cutting edge has the correct position to the work. In the case of FIGURE 15, aluminium or brass is to be machined with the boring tool intended for machining steel. By turning the straight-edge 16 around and re-adjustment of its longitudinal edge 17 in the horizontal position, the boring tool intended for machining steel can also be brought into a position in which it has the correct cutting angle necessary for machining grey cast iron, as shown in FIGURE 16. As may be gathered from this, the alignment face 5 serves in every case for rapid and accurate alignment of the boring tool.

What I claim is:

1. Boring or internal threading tool having a substantially cylindrical shank, a cutter arranged on the front end of the shank and projecting laterally therefrom and on the front end of the shank a plane alignment face situated higher than the operative cutting edge of the cutter, corresponding in width approximately to the shank diameter and permitting the application of a straight edge or the like, which alignment face extends in the axial direction of the shank and the position of which relative to the cutting edge of the cutter is so arranged that with a horizontal position of the alignment face and arrangement of the shank axis in a horizontal plane passing through the axis of the work, the cutter is in the correct cutting position.

2. A boring or internal threading tool as defined in claim 1 comprising an interchangeable tool bit, the shank having a recess with a supporting surface for the tool bit, the supporting surface being inclined downwardly, forwardly and laterally towards the operative cutting edge.

References Cited by the Examiner

UNITED STATES PATENTS

| 1,838,520 | 12/1931 | Archer | 77—58 |
| 2,838,827 | 6/1958 | Wright | 29—96 |
| 2,967,442 | 1/1961 | Forsyth et al. | 77—58 |
| 3,132,542 | 5/1964 | Horvath | 77—58 |

FOREIGN PATENTS

| 923,206 | 7/1947 | France. |
| 1,120,391 | 7/1956 | France. |
| 831,244 | 3/1960 | Great Britain. |

WILLIAM W. DYER, JR., *Primary Examiner.*

G. A. DOST, *Assistant Examiner.*